July 20, 1954   R. W. STARREVELD ET AL   2,684,201
DEVICE FOR DETERMINING CHECK SYMBOLS OF SYMBOL GROUPS
Filed May 7, 1951   4 Sheets-Sheet 1

Inventors
Remmer Willem Starreveld
Cornelis Adriaan Simon Hamelink
By Robert E. Burns  Attorney July 20, 1954 R. W. STARREVELD ET AL 2,684,201
DEVICE FOR DETERMINING CHECK SYMBOLS OF SYMBOL GROUPS
Filed May 7, 1951 4 Sheets-Sheet 3
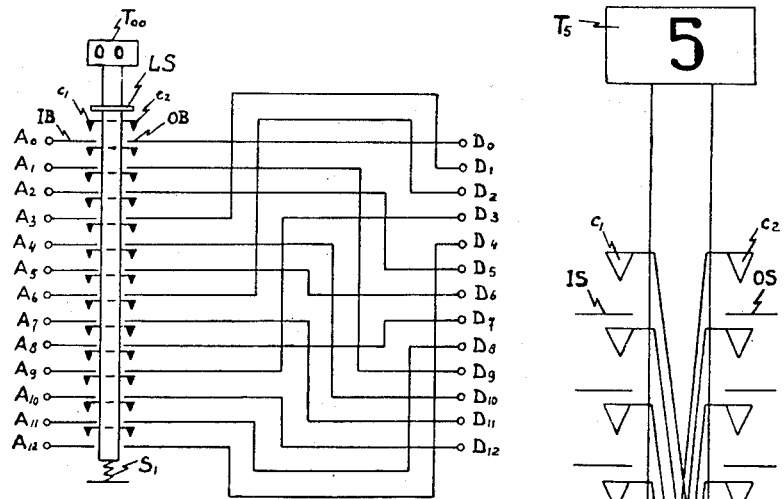
FIG.7A
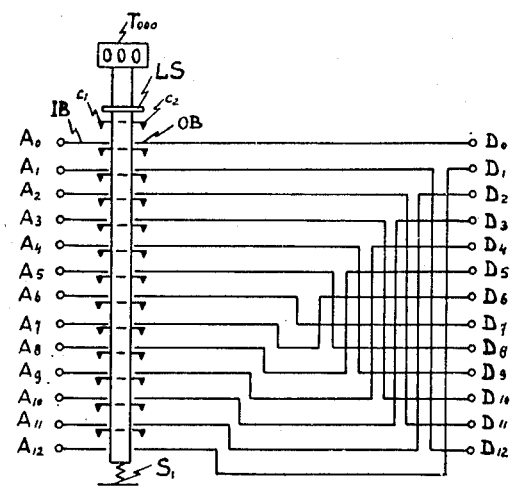
FIG.7B
FIG.8
Inventors
Remmer Willem Starreveld
Cornelis Adriaan Simon Hamelink
By Robert E. Bruno Attorney Patented July 20, 1954

2,684,201

UNITED STATES PATENT OFFICE 2,684,201

DEVICE FOR DETERMINING CHECK SYMBOLS OF SYMBOL GROUPS

Remmer W. Starreveld and Cornelis A. S. Hamelink, Amsterdam, Netherlands, assignors to Theodorus Reumerman, Zandvoort, Netherlands, and Willem Hendrik Theodorus Helmig, Leiden, Netherlands Application May 7, 1951, Serial No. 224,864

Claims priority, application France February 26, 1951

23 Claims. (Cl. 235—61)

The invention relates to a device for facilitating the detection of errors in arbitrary symbol groups composed out of a given series of $n$ symbols, comprising a selector by means of which the symbols of a symbol group may be selected and an indicator displaying an appropriate check symbol after selection of a symbol group, said check symbol giving a univocal indication of the remainder $R_N(G)$ obtained on dividing a number $G$ by a whole number $N$, the symbols of the given series being numbered in a predetermined manner, the said number $G$ being equal to the algebraic sum of the numbers of the symbols of the group, each multiplied by a whole factor $k_i$, the said factors $k_i$ being dependent on the position of the symbol in the group and different for adjacent positions, and the said number $N$ being greater than or equal to $n$ and having no divisors in common with the factors $k_i$ and with the differences between the factors $k_i$ for adjacent positions.

For instance, the symbols of the given series may be digits, and they may be numbered according to their numerical values. The number $N$ may be equal to 13, and the factor $k_i$ for the $i$-th position from the right in a symbol group may be: $k_1=1$, $k_2=10$, $k_3=9$, $k_4=12$, $k_5=3$, $k_6=4$, $k_7=1$, and so on. In this case, the number $G$ for the symbol group 3683507 will be $$7+0+45+36+24+24+3=139$$

and the remainder $R_N(G)$ will be equal to 9. The remainders $R_N(G)$ may be indicated in a univocal manner by using as check symbols thirteen different letters of the alphabet, a remainder 0 being indicated by the letter A, a remainder 1 by the letter B, and so on. In this case, the remainder 9 will be indicated by the letter J, i. e. the letter J will be displayed by the indicator after selection of the symbol group 3683507.

The check symbol determined by means of the above-mentioned device may be added to the symbol group so as to accompany the same throughout its existence. Thus, any mutilation of the symbol group will be immediately detected when the check symbol is again determined, as the check symbol accompanying the symbol group will not correspond with the mutilated group.

It is the object of the present invention to provide for an electric device for facilitating the detection of errors in symbol groups as set forth hereinbefore, which is adapted to be actuated by means of a key board, and which may be operated at any desired speed.

According to the invention, the device comprises at least one switching unit having $N$ input terminals ($A_0$, $A_1$, $A_2$ . . . $A_N$) and $N$ output terminals ($D_0$, $D_1$, $D_2$ . . . $D_N$), adapted to be actuated by the selector and to assume $n$ different positions according to the number of a selected symbol, and constructed in such manner that upon selection of a symbol having the number $a_i$ in position $i$ of a symbol group, any input terminal $A_p$ of the switching unit actuated by this selection is connected with an output terminal $D_q$ of the same switching unit such that $$q = R_N[(k_{i+1}p + bN)/k_i + a_i]$$

wherein $b$ represents a whole number, (which may be zero), $p$ represents the serial number of the input terminal in question and $q$ represents the serial number of the output terminal in question, and before selection of one of the extreme symbols of a symbol group a voltage is applied to the zero input terminal $A_0$ of the switching unit actuated by this selection so as to appear on an output terminal $D_q$ of the same unit after selection of the symbol, this voltage being transferred before selection of the next symbol to the corresponding input terminal $A_q$ of the switching unit actuated by this selection, and so on, so that after selection of the symbol group the said voltage appears on an output terminal $D_r$ of the switching unit actuated upon selection of the other extreme symbol of the group such that $$r = R_N[(G+bN)/k_1]$$

$k_1$ being the factor $k_i$ prevailing for the position of said other extreme symbol, and the output terminals of said last-mentioned switching unit being connected with the indicator in such manner that the said voltage causes the indicator to display the check symbol pertaining to a remander equal to $R_N(k_1r)$.

The exact nature of our invention and any additional objects thereof will appear from the following description of some preferred embodiments, given with reference to the accompanying drawings, wherein Fig. 1 is a side view of a switching unit, seen from the side of the input strips;

Figure 7:
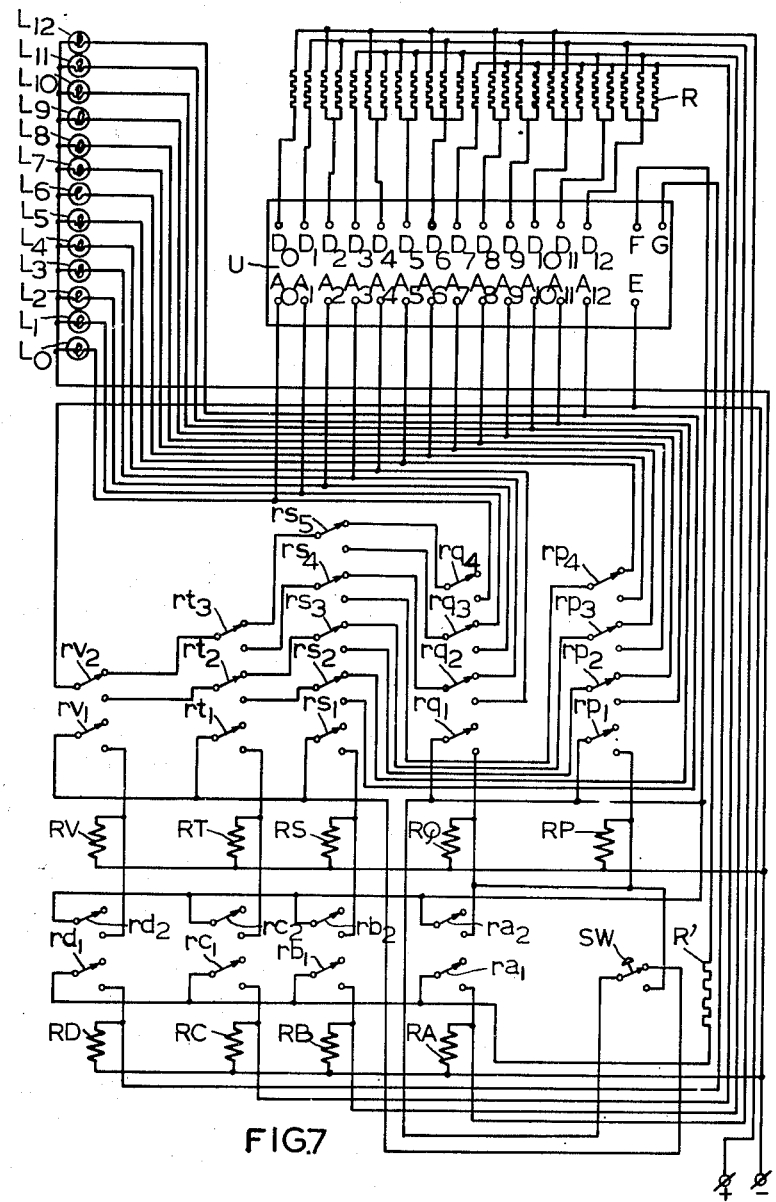
Fig. 7 is a circuit diagram of a device comprising a switching unit as shown in Figs. 5 and 6.

Figs. 7A and 7B relate to a modification of the device shown in Fig. 7, wherein the selector comprises keys for simultaneously adding two or three noughts to a sequence of figures already selected;

Fig. 8 shows a key pertaining to a modification of the switching units shown in Figs. 1–3 and 5–6.

In the embodiments of the invention shown in Figs. 1–8, the number N is assumed to be equal to 13, and the following factors $k_i$ are used: $k_1=1$, $k_2=10$, $k_3=9$, $k_4=12$, $k_5=3$, $k_6=4$, $k_7=1$, and so on. The factor $k_1$ prevails for the first position from the right in a symbol group. The factors $k_i$ for consecutive positions are equal to the remainders obtained on division by 13 of consecutive terms of a geometrical progression, to with the progression 1—10—100—1000, and so on. Thus, the switching unit used for any position in a symbol group will have to be constructed in such manner that upon selection of a symbol having the number $a_i$, any input terminal $A_p$ of the switching unit is connected with an output terminal $D_q$ such that $q = R_{13}(10\ p + a_i)$.

Figure 1:
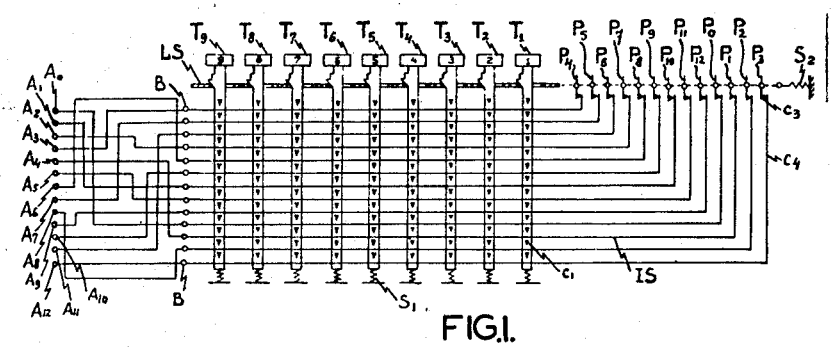
Figure 2:
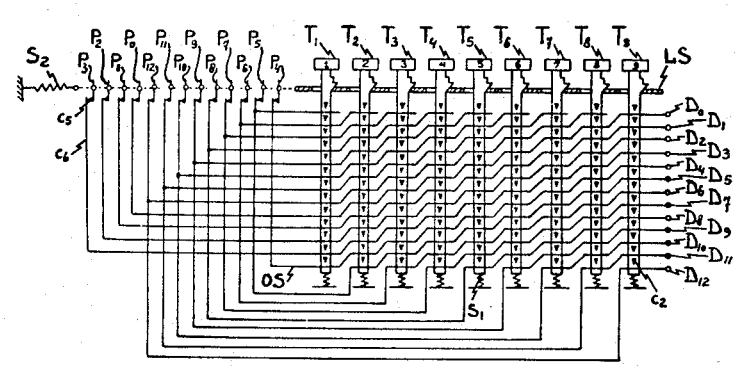
Fig. 2 is a side view of the same unit, seen from the side of the output strips.
Figures 3, 4:
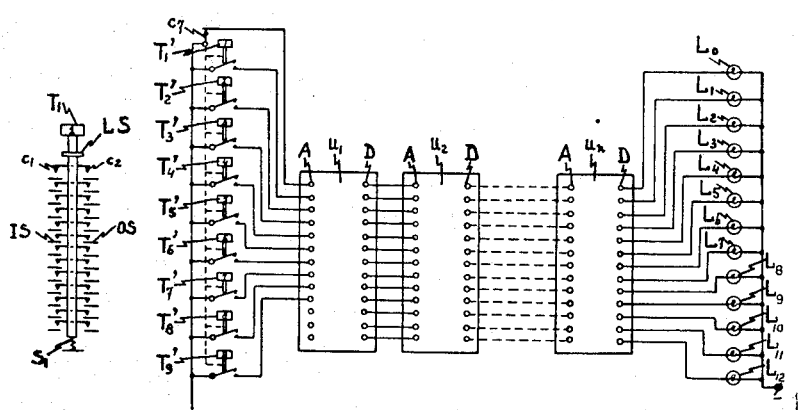
Fig. 3 is a front view of one of the keys of the switching unit shown in Figs. 1 and 2.
Fig. 4 is a circuit diagram of a device comprising a plurality of switching units as shown in Figs. 1, 2 and 3.

The switching unit shown in Figs. 1–3 is controlled by 9 keys, indicated at $T_1$–$T_9$, and serving for the selection of the figures from 1 to 9, respectively. Each of the keys is pressed upwards by a spring $S_1$, and is provided at the top with a bit adapted to be caught in a locking strip LS, which is drawn to the right (in Fig. 1) by a spring $S_2$, and which locks a depressed key until it is released by special means not shown in the drawing. The keys are made of an insulating material, such as a phenol resin, and a plurality of contact bridges are imbedded in the material of the key. As shown in Fig. 3, each of these contact bridges comprises two interconnected contacts $c_1$ and $c_2$ lying at the same level on both sides of the key.

The unit further comprises thirteen input strips common to all the keys, and indicated at IS in Figs. 1 and 3. These input strips lie at the same level at each of the keys; they may be supported by insulators not shown in the drawing. The input strips IS are each connected through one of the terminals indicated at B—B with one of the input terminals $A_0$–$A_{12}$ of the switching unit. The part of the circuit between the input terminals $A_0$–$A_{12}$ and the terminals B—B may be formed as a separate distributing board, if desired.

At the other side of the keys, there are provided thirteen output strips, indicated at OS in Figs. 2 and 3, and each connected with one of the output terminals $D_0$–$D_{12}$ of the switching unit. The output strips OS are formed in stepped fashion so as to lie at a different level at each of the keys. A strip having reached the level of the uppermost contact bridge at one of the keys is continued at the level of the lowermost contact bridge at the next key. The output strips may likewise be supported by insulators not shown in the drawing.

Upon depression of any of the keys, the contacts $c_1$ will each engage one of the input strips IS, and the contacts $c_2$ will each engage one of the output strips OS. Hence, each of the keys constitutes an N-polar switch adapted to connect each of the input strips with a different output strip.

The locking strip LS is mechanically connected with a plurality of contact bridges $p_0$–$p_{12}$. Each of these contact bridges comprises a contact $c_3$ engaging a contact blade $c_4$ connected with one of the input strips IS, and a contact $c_5$ connected with contact $c_3$ and engaging a contact blade $c_6$ connected with one of the output strips OS. Thus, if none of the keys $T_1$–$T_9$ is depressed, each of the input strips IS is connected with one of the output strips OS through one of the contact bridges $p_0$–$p_{12}$. However, as soon as one of the keys is depressed, the locking strip is displaced in such manner as to interrupt the said connections. The bits of the keys $T_1$–$T_9$ are shaped in such manner that the locking strip LS does not quite return to its initial position after depression of a key, so that the connections between the input and output strips via the contact bridges $p_0$–$p_{12}$ remain interrupted as long as a key is depressed. Thus, the contact bridges $p_0$–$p_{12}$ may be said to constitute an additional N-polar switch serving for selection of the digit 0 in the same manner as the keys $T_1$–$T_9$ serve for selection of the digits from 1 to 9.

As may be seen from the drawing, if none of the keys is depressed, input terminal $A_0$ is connected through contact bridge $p_0$ with output terminal $D_0$, input terminal $A_1$ is connected through contact bridge $p_{10}$ with output terminal $D_{10}$, input terminal $A_2$ is connected through contact bridge $p_7$ with output terminal $D_7$ and so on, i. e. any input terminal $A_p$ is connected through contact bridge $p_q$ with an output terminal $D_q$, such that $q = R_{13}(10\ p)$. When key $T_1$ is depressed, input terminal $A_0$ is connected with output terminal $D_1$, input terminal $A_1$ is connected with output terminal $D_{11}$, and so on, so that $q = R_{13}(10\ p+1)$. Generally speaking, the depression of a key $T_s$ will cause any input terminal $A_p$ to be connected with an output terminal $D_q$ such that $q = R_{13}(10\ p+s)$.

Fig. 4 shows the manner in which a plurality of units as described with reference to Figs. 1–3 may be interconnected so as to form a device according to the invention. The device shown in Fig. 4 comprises a simplified switching unit for selection of the first symbol from the left in a symbol group. This simplified unit comprises nine keys $T_1'$–$T_9'$ and a contact $c_7$. Contact $c_7$ is normally closed, and keys $T_1'$–$T_9'$ are provided with a common locking strip similar to the locking strip LS shown in Figs. 1–3 and schematically indicated in Fig. 4 by a dotted line. This locking strip is displaced upon depression of any of the keys $T_1'$–$T_9'$ in such manner as to open contact $c_7$. If none of the keys $T_1'$–$T_9'$ is depressed, the positive terminal + of a voltage source is connected through contact $c_7$ with the zero input terminal of a switching unit $U_1$. Upon depression of a key $T_s'$, the connection with the zero input terminal is interrupted, and the positive terminal of the voltage source is connected with the corresponding input terminal $A_s$ of unit $U_1$.

The output terminals of unit $U_1$, generally indicated at D, are each connected with a corresponding input terminal of a unit $U_2$, and so on. The output terminals D of the last switching unit $U_n$ are each connected through a glow lamp $L_0$–$L_{12}$ with the negative terminal — of the voltage source. The units $U_1$–$U_n$ are fully identical with the switching unit shown in Figs. 1–3. Keys $T_1'$–$T_9'$ and the keys $T_1$–$T_9$ of units $U_1$–$U_n$ are combined into a full key board of usual construction. After selection of a given number by means of this key board, one of the glow lamps $L_0$–$L_{12}$ will be lighted so as to indicate the check symbol pertaining to the selected number.

Instead of the simplified unit shown in Fig. 4, a standard switching unit may be used, having its zero input terminal $A_0$ permanently connected with the positive terminal of the voltage source.

The above-described device may be adapted to any desired values of the factors $k_i$ by changing the connections between terminals A and B in the switching units, and to any desired value of N by changing the number of contact bridges in the keys.

Of course, the device must be provided with means for releasing the depressed keys by displacement of the locking strips after the check symbol has been read.

The following argument shows that the check symbol displayed by the lamps $L_0$–$L_{12}$ is in accordance with the definition given hereinbefore. Upon selection of a symbol having the number $a_i$ in position $i$ of a symbol group, any input terminal $A_p$ of the switching unit in question is connected with an output terminal $D_q$ such that $q = R_N[(k_{i+1}p + bN)/k_i + a_i]$. In the first switching unit from the left, $p$ is always equal to zero, so that $q = a_i$. Now suppose that a symbol group consisting of $s$ symbols is selected, the first symbol from the left having a number $a_s$, the second symbol having the number $a_{s-1}$, and so on. In the first switching unit, a voltage is supplied to the output terminal having the number $a_s$. This voltage is transferred to the output terminal of the second unit having the number $$R_N[(k_s a_s + bN)/k_{s-1} + a_{s-1}]$$

Hence, in the third unit, a voltage will be supplied to the output terminal having the number $R_N[(k_s a_s + k_{s-1} a_{s-1} + bN)/k_{s-2} + a_{s-2}]$, and so on. Thus, it will be clear that the voltage will eventually appear on the output terminal of the last unit having the number $$R_N[(k_s a_s + k_{s-1} a_{s-1} + \ldots + k_2 a_2 + bN)/k_1 + a_1] = R_N[(G + bN)/k_1] = r$$

This voltage is supplied to the glow lamp having the number $k_1 r = R_N(G)$, so that the right check symbol is displayed.

Figure 5:
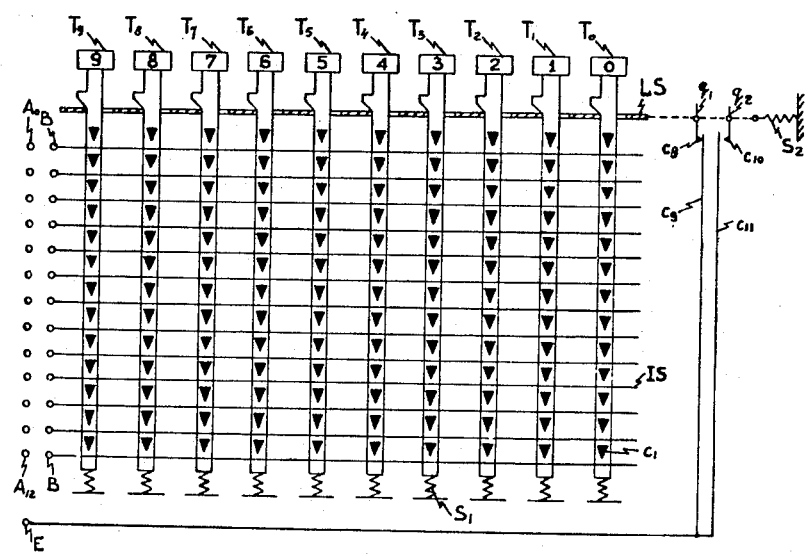
Fig. 5 is a side view of a modified switching unit adapted to be used in a device with a singular key board, seen from the side of the input strips.
Figure 6:
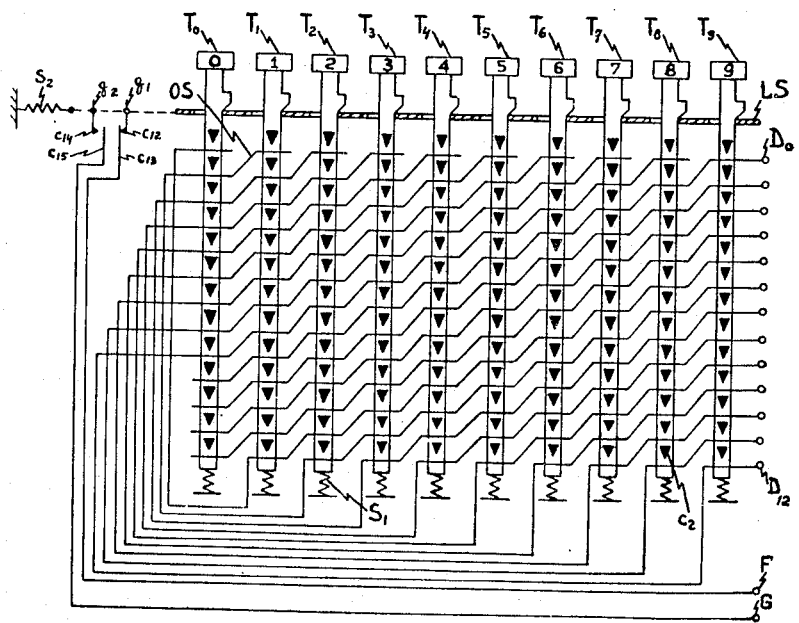
Fig. 6 is a side view of the switching unit shown in Fig. 5, seen from the side of the output strips.

Figs. 5 and 6 show a modified switching unit adapted to be used in a device actuated by means of a singular key board. In this unit, the switch constituted by the contact bridges $p_0$–$p_{12}$ as shown in Figs. 1 and 2 has been replaced by a key $T_0$. The connections between input terminals $A_0$–$A_{12}$ and terminals B—B are exactly the same as in Fig. 1, so that they have been left out in Fig. 5 for the sake of simplicity. A strip LS has been provided which is similar to the locking strip shown in Figs. 1–3, but does not lock the keys in the depressed position. In fact, the strip LS is only displaced upon depression of a key and returns to its initial position as soon as the key is released. Two contact bridges $q_1$ and $q_2$ are mechanically connected with strip LS so as to be displaced upon depression of a key. Contact bridge $q_1$ comprises two interconnected contacts $c_8$ and $c_{12}$, engaging contact blades $c_9$ and $c_{13}$, respectively, and contact bridge $q_2$ comprises two interconnected contacts $c_{10}$ and $c_{14}$, engaging contact blades $c_{11}$ and $c_{15}$, respectively. Contact blades $c_9$ and $c_{11}$ are both connected with an additional input terminal E, whereas contact blades $c_{13}$ and $c_{15}$ are connected with additional output terminals F and G, respectively. The contacts of contact bridge $q_1$ are normally closed and adapted to be opened upon depression of any of the keys, whereas the contacts of contact bridge $q_2$ are normally open and adapted to be closed as long as any of the keys is depressed. Thus, input terminal E is connected with output terminal F when none of the keys is depressed, and with output terminal G as long as any of the keys is depressed.

Fig. 7 shows a device incorporating the unit shown in Figs. 5 and 6. The unit in question, indicated at U in Fig. 7, is provided with input terminals $A_0$–$A_{12}$ and E, and with output terminals $D_0$–$D_{12}$, F and G. Input terminal E is connected with the positive terminal of the voltage source, so that a positive voltage is supplied to terminal F if no keys are depressed, and to terminal G as long as a key is depressed.

The device further comprises a set of glow lamps $L_0$–$L_{12}$, a plurality of decoupling resistors R, a set of output relays RA, RB, RC and RD, a set of input relays RP, RQ, RS, RT and RV, and a resistor R'.

The output terminals $D_0$–$D_{12}$ are each connected through one or more decoupling resistors R with a different combination of input relays, to wit $D_0$ with relay RA, $D_1$ with relay RB, $D_2$ with relays RA and RB, $D_3$ with relay RC, $D_4$ with relays RA and RC, $D_5$ with relays RB and RC, $D_6$ with relays RA, RB and RC, $D_7$ with relay RD, $D_8$ with relays RA and RD, $D_9$ with relays RB and RD, $D_{10}$ with relays RA, RB and RD, $D_{11}$ with relays RC and RD, and $D_{12}$ with relays RB, RC and RD.

Thus, when a positive voltage is supplied to any of the output terminals $D_0$–$D_{12}$ upon depression of a key, the output relays pertaining to this terminal as specified above will be energized. Each of the output relays is provided with a holding contact $ra_1$, $rb_1$, $rc_1$ or $rd_1$, respectively, which is connected with terminal G, so that the output relays energized upon depression of a key are kept energized as long as the key is depressed. Furthermore, each of the output relays comprises a make contact $ra_2$, $rb_2$, $rc_2$ or $rd_2$, respectively, adapted to connect terminal F with one or more of the input relays. For this purpose, contact $ra_2$ is connected with input relays RP and RQ, contact $rb_2$ with input relay RS, contact $rc_2$ with input relay RT, and contact $rd_2$ with input relay RV. Thus, when the depressed key is released, the input relays are energized through terminal F in a combination corresponding with the combination of output relays energized upon depression of the key. Through make contacts of the energized input relays, a positive voltage is supplied to the input terminal of the switching unit which corresponds with the output terminal to which a voltage has been supplied. Of course, the holding circuits of the output relays are interrupted at G when the key is released, but as the output relays are slow to de-energize and the input relays are quick to energize, the input relays will be energized in the desired combination before the output relays have had time to shift their contacts. Each of the input relays has a holding contact $rp_1$, $rq_1$, $rs_1$, $rt_1$ or $rv_1$, respectively, so that the input relays are held energized until the next key is depressed. Upon depression of the next key, the voltage appearing on one of the input terminals is transferred to one of the output terminals so as to energize a corresponding combination of output relays. At the same time, the holding circuits of the input relays are interrupted, but as the output relays are quick to energize, and the input relays slow to de-energize, the output relays will have been energized in the desired combination before the input relays have had time to shift their contacts. Thus, one and the same switching unit may be used for all the symbols of a symbol group. After selection of the last symbol, a voltage will appear on the input terminal corresponding with the check symbol, so that the check symbol is displayed by one of the glow lamps $L_0$–$L_{12}$. After the check symbol has been read, pushbutton-switch SW is depressed, and the holding circuits of relays RS, RT and RV are interrupted, so that these relays are de-energized, if necessary. At the same time, relays RP and RQ are connected with terminal F of the switching unit, so that these relays are energized, and a voltage is supplied to $A_0$ through contacts $rv_2$, $rt_3$, $rs_5$ and $rq_4$. Lamp $L_0$ is lighted, and this is a signal for the operator that switch SW may be released. After release of the switch, relays RP and RQ are held by means of their holding contacts $rp_1$ and $rq_1$. Resistor R' serves to reduce the voltage operative in the holding circuits of the output relays.

In order to make the operation of the device perfectly clear, a specific example will be considered, wherein the check symbol of the number 3683507 is to be determined. Initially, a positive voltage is supplied to $A_0$ through contacts $rv_2$, $rt_3$, $rs_5$ and $rq_4$. Key 3 is depressed and the voltage is transferred to $D_3$, so that relay RC is energized, and relays RP and RQ are de-energized. Key 3 is released and relay RT is energized through contact $rc_2$, so that a positive voltage is supplied to $A_3$ through contacts $rv_2$, $rt_3$, $rs_4$ and $rq_2$. Relay RC is de-energized.

Key 6 is depressed and the positive voltage appearing on $A_3$ is transferred to $D_{10}$. Relays RA, RB and RD are energized and relay RT is de-energized. Key 6 is released and relays RP, RQ, RS and RV are energized through contacts $ra_2$, $rb_2$ and $rd_2$. Relays RA, RB and RD are de-energized and a positive voltage is supplied to $A_{10}$ through contacts $rv_2$, $rt_2$, $rs_3$ and $rp_2$.

Key 8 is depressed and the positive voltage appearing on $A_{10}$ is transferred to $D_4$. Relays RA and RC are energized and relays RP, RQ, RS and RV are de-energized. Key 8 is released and relays RP, RQ and RT are energized through contacts $ra_2$ and $rc_2$. Relays RA and RC are de-energized and a positive voltage is applied to $A_4$ through contacts $rv_2$, $rt_3$, $rs_4$ and $rq_2$.

Key 3 is depressed and the positive voltage appearing on $A_4$ is transferred to $D_4$. Relays RA and RC are energized and relays RP, RQ and RT are de-energized. Key 3 is released and relays RP, RQ and RT are energized through contacts $ra_2$ and $rc_2$. Relays RA and RC are de-energized and a positive voltage is applied to $A_4$ through contacts $rv_2$, $rt_3$, $rs_4$ and $rq_2$.

Key 5 is depressed and the positive voltage appearing on $A_4$ is transferred to $D_6$. Relays RA, RB and RC are energized and relays RP, RQ and RT are de-energized. Key 5 is released and relays RP, RQ, RS and RT are energized through contacts $ra_2$, $rb_2$ and $rc_2$. Relays RA, RB and RC are de-energized and a positive voltage is supplied to $A_6$ through contacts $rv_2$, $rt_3$, $rs_4$ and $rp_4$.

Key 0 is depressed and the positive voltage appearing on $A_6$ is transferred to $D_3$. Relays RA and RD are energized and relays RP, RQ, RS and RT are de-energized. Key 0 is released and relays RP, RQ and RV are energized through contacts $ra_2$ and $rd_2$. Relays RA and RD are de-energized and a positive voltage is supplied to $A_8$ through contacts $rv_2$, $rt_2$, $rs_3$ and $rp_3$.

Key 7 is depressed and the positive voltage appearing on $A_8$ is transferred to $D_9$. Relays RB and RD are energized and relays RP, RQ and RV are de-energized. Key 7 is released and relays RS and RV are energized through contacts $rb_2$ and $rd_2$. Relays RB and RD are de-energized and a positive voltage is supplied to $A_9$ through contacts $rv_2$, $rt_2$, $rs_3$ and $rp_2$.

The positive voltage appearing on $A_9$ is also supplied to lamp $L_9$, so that the check symbol indicating a remainder 9 is displayed. After this check symbol has been read, switch SW is depressed, so that relays RS and RV are de-energized, and relays RP and RQ are energized so as to return the device to its zero position.

Some of the known business machines actuated by means of a singular key board are provided with keys for simultaneously adding a plurality of noughts to a sequence of figures already selected. Keys of this kind may also be provided on the key board of the device shown in Fig. 7. The manner in which these keys are to be connected is shown in Figs. 7A and 7B.

Fig. 7A is a front view of a key $T_{00}$ serving for adding two noughts to a sequence of figures. By adding two noughts, the number represented by said sequence is multiplied by 100. Hence, if the number first had a check symbol corresponding with a remainder $p$, it will not have a check symbol corresponding with a remainder $R_N$ (100 $p$). For $N=13$, the check symbol will correspond with a remainder $R_N(9\ p)$, as $R_{13}(100) = 9$.

Therefore, the key $T_{00}$ represented in Fig. 7A is formed as a switch adapted to interconnect any input terminal $A_p$ of the switching unit with an output terminal $D_q$ such that $q = R_{13}(9\ p)$. The input blades IB of this switch are each connected with one of the input terminals, in parallel with the input strips IS shown in Fig. 5. The output blades OB are each connected with one of the output terminals, in parallel with the output strips OS shown in Fig. 6. Contacts $c_1$ and $c_2$ of contact bridges incorporated in the key are adapted to interconnect the input and output blades. The key cooperates with the strip LS in the same manner as the keys $T_0$–$T_9$ shown in Figs. 5 and 6. Upon depression of the key, input terminal $A_0$ is connected with output terminal $D_0$, input terminal $A_1$ with output terminal $D_9$, input terminal $A_2$ with output terminal $D_5$, and so on.

The key $T_{000}$ shown in Fig. 7B serves to add three noughts to a sequence of figures. Hence, this key is formed as a switch adapted to connect any input terminal $A_p$ of the switching unit with an output terminal $D_q$ such that $$q = R_{13}(1000\ p) = R_{13}(12\ p)$$

It is pointed out that the arrangements shown in Figs. 7A and 7B relate to the case that the factors $k_i$ are equal to the remainders obtained on division by N of the terms of the geometrical progression 1—10—100 etc., having a ratio 10. In general, if the ratio of consecutive terms of the said progression is $w$, $q$ must be equal to $R_N(w^2.p)$ for key $T_{00}$, and to $R_N(w^3.p)$ for key $T_{000}$.

Fig. 8 relates to a modification of the switching units shown in Figs. 1–3 and 5–6, wherein both the input strips IS and the output strips OS are straight so as to occupy the same level at all keys, but wherein the contacts $c_1$ and $c_2$ of each contact bridge incorporated in a key are placed at a different level, in such manner that the difference of the levels of contacts $c_1$ and $c_2$ corresponds with the number of the symbol to be selected by means of the key in question.

In Fig. 8, a key $T_5$ serving for selection of the figure 5 is shown, which is adapted to be used in the above-mentioned modified switching unit. As appears from the drawing, the contact $c_1$ engaging a certain input strip $IS_m$ is connected with the contact $c_2$ engaging the output strip $OS_{m+5}$ ot $OS_{m-8}$, as the case may be. The connections provided for this purpose are imbedded in the key material so as to be insulated with respect to each other. As stated hereinbefore, each switching unit must satisfy the condition $q=R_N[(k_{i+1}p+bN)/k_i+a_i]$ upon selection of a symbol having the number $a_i$. The multiplication by $k_{i+1}/k_i$ which is necessary for this purpose is performed in the same manner as in the units according to Figs. 1–3 and 5–6 by suitable connections between terminals $A_0$–$A_{12}$ and terminals B—B. However, the addition of $a_i$ is performed by means of the connections provided within the keys. Generally speaking, a contact $c_1$ engaging an input strip $IS_m$ must be connected for this purpose with a contact $c_2$ engaging the output strip $OS_{m+a_i}$ or $OS_{m+a_i-N}$.

The devices described with reference to Figs. 1–8 may be incorporated in a business machine, if desired. For this purpose, the keys of the said machine may be used as actuating means for the device at the same time, or the keys of the device may be actuated by electromagnets controlled by the keys of the machine.

A numbering device for printing consecutive serial numbers on documents has been proposed, which is provided with a check wheel adapted to be automatically displaced together with the unit figure wheel so as to display a check symbol as defined hereinbefore for each serial number displayed by the figure wheels. A device according to the present invention may be used to advantage in combination with such a numbering device in order to stop the printing operation as soon as a wrong number is printed due to a faulty operation of the numbering device.

For this purpose, use is made of switching units comprising rotatory switches instead of the key operated switches shown in Figs. 1–8. The figure wheels and the checking wheel of the numbering device are each coupled with the rotatory switches of one of the switching units, and the output terminals of the switching unit coupled with the check wheel of the numbering device are connected with an alarm circuit in such manner that the alarm circuit is actuated as soon as a difference appears between the check symbol computed by means of the device according to the present invention, and the check symbol displayed by the check wheel of the numbering device. Upon actuation of the alarm circuit, the printing operation is interrupted, so that a waste of documents due to a faulty operation of the numbering device is prevented.

The invention is not limited to the specific embodiments described, and many modifications and alterations may be applied thereto within the the scope of the invention.

In the appended claims, the term "group" or "symbol group" designates a group consisting of any desired number of symbols selected from a given series of $n$ symbols, and the symbols in said series are assumed to be numbered in a predetermined order. The term "check symbol of a symbol group" designates a symbol giving a univocal indication of the remainder $R_N(G)$ obtained on dividing a number $G$ by a whole number $N$, $G$ being equal to the algebraic sum of the numbers of the symbols of the group each multiplied by a whole factor $k_i$ dependent on the position of the symbol in the group and different for adjacent positions, and $N$ being greater than or equal to $n$ and having no divisors in common with any of the factors $k_i$, nor with any of the differences between the factors $k_i$ for adjacent positions.

We claim:

1. A device for determining the check symbol of a symbol group, comprising a selector for inserting the symbols of a group, an indicator displaying the check symbol, at least one switching unit actuated by said selector, adapted to assume $n$ different positions according to the number of a selected symbol, having $N$ input terminals and $N$ output terminals, and so constructed that any input terminal $A_p$ is connected with an output terminal $D_q$ such that $$q=R_N[(k_{i+1}p+bN)/k_i+\alpha_i]$$

upon selection of a symbol having the number $a_i$ in position $i$ of a group, $b$ being a whole number, means operative before selection of one of the extreme symbols of a group for applying a voltage to the zero input terminal ($A_0$) of the switching unit actuated by this selection, means for transferring the voltage appearing after selection of a symbol on an output terminal ($D_q$) of the switching unit actuated by this selection to the corresponding input terminal ($A_q$) of the switching unit actuated by the selection of the next symbol, and means for supplying the voltage appearing after selection of a group on any output terminal $D_r$ of the switching unit actuated by the selection of the other extreme symbol of a group to said indicator in such manner that the same displays the check symbol pertaining to a remainder $R_N(k_1 r)$, $k_1$ being the factor $k_i$ for the position of said other extreme symbol.

2. A device as claimed in claim 1, wherein the factors $k_i$ for consecutive positions in a symbol group are equal to the remainders obtained on division by $N$ of consecutive terms of a geometrical progression.

3. A device for determining the check symbol of a symbol group, comprising a selector for inserting the symbols of a group, at least one switching unit actuated by said selector, adapted to assume $n$ different positions according to the number of a selected symbol, having $N$ input terminals and $N$ output terminals, and so constructed that any input terminal $A_p$ is connected with an output terminal $D_q$ such that $$q=R_N[(k_{i+1}p+bN)/k_i+\alpha_i]$$

upon selection of a symbol having the number $a_i$ in position $i$ of a group, $b$ being a whole number, means operative before selection of one of the extreme symbols of a group for applying a voltage to the zero input terminal ($A_0$) of the switching unit actuated by this selection, means for transferring the voltage appearing after selection of a symbol on an output terminal ($D_q$) of the switching unit actuated by this selection to the corresponding input terminal ($A_q$) of the switching unit actuated by the selection of the next symbol, and a plurality of glow lamps each displaying one of the check symbols and each connected with one of the output terminals of the switching unit actuated by the selection of the other extreme symbol of a group in such manner that any output terminal $D_r$ is connected with the glow lamp displaying the check symbol pertaining to a remainder equal to $R_N(k_1 r)$, $k_1$ being the factor $k_i$ for the position of said other extreme symbol.

4. A device for determining the check symbol of a symbol group, comprising a selector for inserting the symbols of a group, an indicator displaying the check symbol, at least one switching unit actuated by said selector, containing a plurality of N-polar switches each actuated by the selection of a different symbol, N input terminals, and N output terminals, and so constructed that any input terminal $A_p$ is connected with an output terminal $D_q$ such that $$q = R_N[(k_{i+1}p + bN)/k_i + a_i]$$

upon selection of a symbol having the number $a_i$ in position $i$ of a group, $b$ being a whole number, means operative before selection of one of the extreme symbols of a group for applying a voltage to the zero input terminal ($A_0$) of the switching unit actuated by this selection, means for transferring the voltage appearing after selection of a symbol on an output terminal ($D_q$) of the switching unit actuated by this selection to the corresponding input terminal of the switching unit actuated by the selection of the next symbol, and means for supplying the voltage appearing after selection of a group on any output terminal $D_r$ of the switching unit actuated by the selection of the other extreme symbol of a group to said indicator in such manner that the same displays the check symbol pertaining to a remainder equal to $R_N(k_1 r)$, $k_1$ being the factor $k_i$ for the position of said other extreme symbol.

5. A device as claimed in claim 4, wherein said selector comprises at least one key group consisting of a plurality of keys each actuating one of the said switches each switching unit further comprises a plurality of input strips each connected with one of the said input terminals and a plurality of output strips each connected with one of the said output terminals, and wherein each of the said switches comprises N contact bridges insulated with respect to each other, and each adapted to connect one of the said input strips with one of the said output strips upon depression of the associated key.

6. A device for determining the check symbol of a symbol group, comprising a selector having at least one key group consisting of a plurality of keys each serving for the selection of a different symbol of the given series, at least one switching unit provided with N input terminals, a plurality of input strips each connected with one of the said input terminals, N output terminals, a plurality of output strips each connected with one of the said output terminals, and a plurality of N-polar switches actuated by the said keys and each containing N contact bridges each adapted to connect one of the said input strips with one of the said output strips upon depression of the associated key, insulated with respect to each other and each having two interconnected contacts lying at the same level, the strips of one of the said pluralities being formed and arranged in such manner as to occupy a different level at each of the said switches, and the said switching unit being so constructed that any input terminal $A_p$ is connected with an output terminal $D_q$ such that $q = R_N[(k_{i+1}p + bN)/k_i + a_i]$ upon selection of a symbol having the number $a_i$ in position $i$ of a group, $b$ being a whole number, means operative before selection of one of the extreme symbols of a group for applying a voltage to the zero input terminal ($A_0$) of the switching unit actuated by this selection, means for transferring the voltage appearing after selection of a symbol on an output terminal ($D_q$) of the switching unit actuated by this selection to the corresponding input terminal ($A_q$) of the switching unit actuated by the selection of the next symbol, an indicator displaying the check symbol, and means for supplying the voltage appearing after selection of a group on any output terminal $D_r$ of the switching unit actuated by the selection of the other extreme symbol of a group to said indicator in such manner that the same displays the check symbol pertaining to a remainder equal to $R_N(k_1 r)$, $k_1$ being the factor $k_i$ for the position of said other extreme symbol.

7. A device for determining the check symbol of a symbol group, comprising a selector having at least one key group consisting of a plurality of keys each serving for the selection of a different symbol of the given series, at least one switching unit provided with N input terminals, a plurality of input strips lying at a constant level and each connected with one of the said input terminals, N output terminals, a plurality of output strips lying at a constant level and each connected with one of the said output terminals, and a plurality of N-polar switches actuated by the said keys and each containing N contact bridges each adapted to connect one of the said input strips with one of the said output strips upon depression of the associated key, insulated with respect to each other and each having two interconnected contacts lying at a different level in such manner that the difference of level between interconnected contacts in each of the said switches corresponds with the number of the symbol selected by means of the associated key, and the said switching unit being so constructed that any input terminal $A_p$ is connected with an output terminal $D_q$ such that $$q = R_N[(k_{i+1}p + bN)/k_i + a_i]$$

upon selection of a symbol having the number $a_i$ in position $i$ of a group, $b$ being a whole number, means operative before selection of one of the extreme symbols of a group for applying a voltage to the zero input terminal ($A_0$) of the switching unit actuated by this selection, means for transferring the voltage appearing after selection of a symbol on an output terminal ($D_q$) of the switching unit actuated by this selection to the corresponding input terminal ($A_q$) of the switching unit actuated by the selection of the next symbol, an indicator displaying the check symbol, and means for supplying the voltage appearing after selection of a group on any output terminal $D_r$ of the switching unit actuated by the selection of the other extreme symbol of the group to said indicator in such manner that the same displays the check symbol pertaining to a remainder to $R_N(k_1 r)$, $k_1$ being the factor $k_i$ for the position of said other extreme symbol.

8. A device for determining the check symbol of a symbol group, comprising a selector for inserting the symbols of a group, an indicator displaying the check symbol, a plurality of switching units each for one of the positions to be occupied by a symbol in a group, actuated by said selector, adapted to assume $n$ different positions according to the number of a selected symbol, having N input terminals and N output terminals, and so constructed that any input terminal $A_p$ is connected with an output terminal $D_q$ such that $q = R_N[(k_{i+1}p + bN)/k_i + a_i]$ upon selection of a symbol having the number $a_i$ in position $i$ of a group, $b$ being a whole number, means for connecting the zero input terminal ($A_0$) of the switching unit for one of the extreme positions of a group with one of the terminals of a voltage source, means for connecting the output terminals of the switching unit for the other extreme position of a group through said indicator with another terminal of said voltage source in such manner that a voltage appearing on any output terminal $D_r$ of said last-mentioned switching unit causes said indicator to display the check symbol pertaining to a remainder equal to $R_N(k_1 r)$, $k_1$ being the factor $k_i$ for said other extreme position, and means for connecting the output terminals of each switching unit except the last-mentioned one each with the corresponding input terminal of the next switching unit.

9. A device for determining the check symbol of a symbol group, comprising a selector for inserting the symbols of a group, an indicator displaying the check symbol, a simplified switching unit for one of the extreme positions of a group, actuated by said selector, adapted to assume $n$ different positions according to the number of a selected symbol, having one input terminal and $n$ output terminals, and so constructed that said input terminal is connected with an output terminal $D_q$ such that $q = a_s$ upon selection of a symbol having the number $a_s$ in said extreme position, a plurality of switching units each for one of the remaining positions to be occupied by a symbol in a group, actuated by said selector, having N input terminals and N output terminals, and so constructed that any input terminal $A_p$ is connected with an output terminal $D_q$ such that $$q = R_N[(k_{i+1}p + bN)/k_i + a_i]$$

upon selection of a symbol having the number $a_i$ in position $i$ of a group, $b$ being a whole number, means for connecting the input terminal of said simplified switching unit with one of the terminals of a voltage source, means for connecting the output terminals of the switching unit for the other extreme position of a group through said indicator with another terminal of said voltage source in such manner that a voltage appearing on any output terminal $D_r$ of said last-mentioned switching unit causes said indicator to display the check symbol pertaining to a remainder equal to $R_N(k_1 r)$, $k_1$ being the factor $k_i$ for said other extreme position, and means for connecting the output terminals of said simplified switching unit and of all other switching units except the switching unit for said other extreme position each with the corresponding input terminal of the next switching unit.

10. A device for determining the check symbol of a symbol group, comprising an indicator displaying the check symbol, a plurality of key groups each for one of the positions to be occupied by a symbol in a group and each containing a plurality of keys each serving for the selection of a different symbol of the given series, an indicator displaying the check symbol, a plurality of switching units each actuated by one of the said key groups, adapted to assume $n$ different positions according to the number of a symbol selected by means of the associated key group, having N input terminals and N output terminals, and so constructed that any input terminal $A_p$ is connected with an output terminal $D_q$ such that $q = R_N[(k_{i+1}p + bN)/k_i + a_i]$ upon selection of a symbol having the number $a_i$ in position $i$ of a group, $b$ being a whole number, a plurality of locking means each for one of the said key groups and each adapted to lock a depressed key in the associated key group, means for connecting the zero input terminal ($A_0$) of the switching unit for one of the extreme positions of a symbol group with one of the terminals of a voltage source, means for connecting the output terminals of the switching unit for the other extreme position of a symbol group through said indicator with another terminal of said voltage source in such manner that a voltage appearing on any output terminal $D_r$ of said last-mentioned switching unit causes said indicator to display the check symbol pertaining to a remainder equal to $R_N(k_1 r)$, $k_1$ being the factor $k_i$ for said other extreme position, and means for connecting the output terminals of each switcing unit except the last-mentioned one each with the corresponding input terminal of the next switching unit.

11. A device as claimed in claim 10, wherein each key group only comprises keys for the selection of the symbols numbered from 1 to $(n-1)$, the symbol having the number zero being selected by leaving all the keys of the key group in their non-depressed position, and wherein each switching unit comprises an N-polar switch pertaining to the symbol having the number zero and having its contacts normally closed, and means actuated by a displacement of said locking means for opening the said contacts upon depression of any of the keys of the associated key group.

12. A device for determining the check symbol of a symbol group, comprising an indicator displaying the check symbol, a plurality of key groups each for one of the positions to be occupied by a symbol in a group and each containing a plurality of keys each serving for the selection of a different symbol of the given series, an indicator displaying the check symbol, a simplified switching unit actuated by the key group for one of the extreme positions of a symbol group, adapted to assume $n$ different positions according to the number of a selected symbol, having one input terminal and $n$ output terminals, and so constructed that said input terminal is connected with an output terminal $D_q$ such that $q = a_s$ upon selection of a symbol having the number $a_s$ in said extreme position, a plurality of switching units each actuated by one of the remaining key groups, adapted to assume $n$ different positions according to the number of a symbol selected by means of the associated key group, having N input terminals and N output terminals, and so constructed that any input terminal $A_p$ is connected with an output terminal $D_q$ such that $q = R_N[(k_{i+1}p + bN)/k_i + a_i]$ upon selection of a symbol having the number $a_i$ in position $i$ of a group, $b$ being a whole number, a plurality of locking means each for one of the said key groups and each adapted to lock a depressed key in the associated key group, means for connecting the input terminal of said simplified switching unit with one of the terminals of a voltage source, means for connecting the output terminals of the switching unit for the other extreme position of a symbol group through said indicator with another terminal of said voltage source in such manner that a voltage appearing on any output terminal $D_r$ of said last-mentioned switching unit causes said indicator to display the check symbol pertaining to a remainder equal to $R_N(k_1 r)$, $k_1$ being the factor $k_i$ for said other extreme position, and means for connecting the output terminals of said simplified switching unit and of all other switching units except the switching unit for said other extreme position each with the corresponding input terminal of the next switching unit.

13. A device as claimed in claim 12, wherein each key group only comprises keys for the selection of the symbols numbered from 1 to $(n-1)$, the symbols having the number zero being selected by leaving all the keys of the key group in their non-depressed position, and wherein said simplified switching unit comprises a unipolar switch pertaining to the symbol having the number zero and having its contacts normally closed, and means actuated by the locking means of the associated key group for opening the said contacts upon depression of any of the keys of said key group, and wherein each of the other switching units comprises an N-polar switch pertaining to the symbol having the number zero and having its contacts normally closed, and means actuated by the locking means of the associated key group for opening the said contacts upon depression of any of the keys of the key group in question.

14. A device for determining the check symbol of a symbol group, comprising a plurality of key groups each for one of the positions to be occupied by a symbol in a group and each containing $(n-1)$ keys serving for the selection of the symbols numbered from 1 to $(n-1)$ of the given series; a locking strip in each key group for locking a depressed key; a simplified switching unit actuated by the key group for one of the extreme positons of a symbol group and provided with one input terminal, $n$ output terminals, $n$ unipolar switches each adapted to connect one of the said input terminals with a different one of said output terminals, one of these switches being normally closed and the other switches being actuated each by one of the keys of the associated key group, and means actuated by the locking strip of the associated key group for opening said first-mentioned switch upon depression of any of the keys; a plurality of standard switching units each actuated by one of the remaining key groups, and each provided with N input terminals, a plurality of input strips each connected with one of the said input terminals, N output terminals, a plurality of output strips each connected with one of the said output terminals, a plurality of N-polar switches, each containing N contact bridges each adapted to connect one of the said input strips with one of the said output strips, insulated with respect to each other and each having two interconnected contacts lying at the same level, one of these switches being normally closed and the other switches being actuated each by one of the keys of the associated key group, and means actuated by the associated locking strip for opening the contacts of said first-mentioned switch upon depression of any of the keys of the associated key group, the strips of one of the said pluralities being formed and arranged in such manner as to occupy a different level at each of the said switches and the said standard switching units being so constructed that any input terminal $A_p$ is connected with an output terminal $D_q$ such that $$q = R_N[(k_{i+1}p + bN)/k_i + a_i]$$

upon selection of a symbol having the number $a_i$ in position $i$ of a symbol group, $b$ being a whole number; means for releasing the depressed keys by a displacement of the said locking strips; a voltage source with at least two terminals, one of these terminals being connected with the input terminal of said simplified switching unit; a plurality of glow lamps each displaying one of the check symbols and each connected on one side with another terminal of said voltage source and on the other side with one of the output terminals of the standard switching unit for the other extreme position of a symbol group in such manner that any output terminal $D_r$ is connected with the glow lamp displaying the check symbol pertaining to a remainder equal to $R_N(k_1r)$, $k_1$ being the factor $k_i$ for said other extreme position; and means connecting the output terminals of said simplified switching unit and of all the said standard switching units except the last-mentioned one each with the corresponding input terminal of the next switching unit.

15. A device for determining the check symbol of a symbol group, wherein the factors $k_i$ for consecutive positions in a symbol group are equal to the remainders obtained on division by N of consecutive terms of a geometrical progression comprising a singular selector by means of which all the symbols of a group may be successively inserted, a switching unit actuated by said selector, adapted to assume $n$ different operative positions according to the number of a selected symbol, having N input terminals and N output terminals, and so constructed that any input terminal $A_p$ is connected with an output terminal $D_q$ such that $$q = R_N[(k_{i+1}p + bN)/k_i + a_i]$$

upon selection of a symbol having the number $a_i$ in any position of a group, $b$ being a whole number, storing means connected with the output terminals of said switching unit for registering the output terminal to which a voltage is supplied upon selection of a symbol, means actuated by said storing means for supplying a voltage to the corresponding input terminal of said switching unit before selection of the next symbol, means operative before selection of the first symbol of a group for applying a voltage to the zero input terminal $(A_0)$ of said switching unit, an indicator displaying the check symbol, and means for supplying the voltage appearing after selection of a group on any input terminal $A_r$ of said switching unit to said indicator in such manner that the same displays the check symbol pertaining to a remainder equal to $R_N(k_1r)$, $k_1$ being the factor $k_i$ for the position of the last symbol of a group.

16. A device for determining the check symbol of a symbol group, wherein the factors $k_i$ for consecutive positions in a symbol group are equal to the remainders obtained on division by N of consecutive terms of a geometrical progression, comprising a singular key board by means of which all the symbols of a group may be successively inserted, a switching unit actuated by said key board, adapted to assume $n$ different operative positions according to the number of a selected symbol, having N input terminals and N output terminals, and so constructed that any input terminal $A_p$ is connected with an output terminal $D_q$ such that $$q = R_N[(k_{i+1}p + bN)/k_i + a_i]$$

upon selection of a symbol having the number $a_i$ in any position of a group, $b$ being a whole number, a set of output relays quick to energize and slow to de-energize and connected with the said output terminals in at least N different combinations, a first contact closed as long as any key of said key board is depressed, a second contact closed as long as none of the keys of said key board is depressed, a holding circuit for each of the said output relays containing said first contact, a set of input relays quick to energize and slow to de-energize, energizing circuits for said input relays each containing said second contact and a make contact of one of the said output relays, a holding circuit for each of the said input relays containing said second contact, means for supplying a voltage to an input terminal $A_q$ of said switching unit corresponding with the output terminal $D_q$ to which a voltage has been previously supplied through contacts of the said input relays, means for supplying a voltage to the zero input terminal ($A_0$) of said switching unit before selection of the first symbol of a group, an indicator displaying the check symbol, and means for supplying the voltage appearing after selection of a group on any input terminal $A_r$ of said switching unit to said indicator in such manner that the same displays the check symbol pertaining to a remainder equal to $R_N(k_1r)$, $k_1$ being the factor $k_i$ for the position of the last symbol of a group.

17. A device as claimed in claim 16, further comprising a member adapted to be displaced upon depression of any of the keys of said key board so as to close said first contact and to open said second contact.

18. A device as claimed in claim 17, further comprising a plurality of decoupling resistors inserted between the output terminals of said switching unit and the said output relays.

19. A device for determining the check smybol of a symbol group, wherein the factors $k_i$ for consecutive positions in a symbol group are equal to the remainders obtained on division by N of consecutive terms of a geometrical progression, comprising a singular key board for successively inserting the symbols of a group; a switching unit provided with N input terminals, a plurality of input strips each connected with one of the said input terminals, N output terminals, a plurality of output strips each connected with one of the said output terminals, and a plurality of N-polar switches each actuated by one of the keys of said key board and each containing N contact bridges each adapted to connect one of the said input strips with one of the said output strips, insulated with respect to each other and each having two interconnected contacts lying at the same level, the strips of one of the said pluralities being formed and arranged in such manner as to occupy a different level at each of the said switches and the said switching unit being so constructed that any input terminal $A_p$ is connected with an output terminal $D_q$ such that $$q = R_N[(k_{i+1}p + bN)/k_i + a_i]$$

upon selection of a symbol having the number $a_i$ in any position of a group, $b$ being a whole number; a plurality of decoupling resistors; a set of output relays quick to energize and slow to de-energize and connected through said decoupling resistors with the said output terminals in at least N different combinations; a first contact closed as long as any key of said key board is depressed; a second contact closed as long as none of the keys of said key board is depressed; a member displaced upon depression of any of the keys of said key board so as to close said first contact and to open said second contact; a holding circuit for each of the said output relays containing said first contact; a set of input relays quick to energize and slow to de-energize; energizing circuits for said input relays each containing said second contact and a make contact of one of the said output relays; a holding circuit for each of the said input relays containing said second contact; means for supplying a voltage to an input terminal $A_q$ of said switching unit corresponding with the output terminal $D_q$ to which a voltage has been previously supplied through contacts of said input relays; means for supplying a voltage to the zero input terminal ($A_0$) of said switching unit before selection of the first symbol of a group through contacts of the said input relays; and a plurality of glow lamps each displaying one of the check symbols and each connected with one of the input terminals of said switching unit in such manner that any input terminal $A_r$ is connected with the glow lamp displaying the check symbol pertaining to a remainder equal to $R_N(k_1r)$, $k_1$ being the factor $k_i$ for the position of the last symbol of a group.

20. A device as claimed in claim 19, further comprising a clearing switch energizing the input relays by means of which a voltage is supplied to the zero input terminal ($A_0$) of said switching unit and interrupting the holding circuits of all other input relays.

21. A device for determining the check symbol of a symbol group, wherein the factors $k_i$ for consecutive positions in a symbol group are equal to the remainders obtained on division by N of consecutive terms of a geometrical progression, comprising a singular key board for successively inserting the symbols of a group, a switching unit actuated by said key board, containing a plurality of N-polar switches each actuated by the selection of a different symbol, N input terminals, and N output terminals, and so constructed that any input terminal $A_p$ is connected with an output terminal $D_q$ such that $$q = R_N[(k_{i+1}p + bN)/k_i + a_i]$$

upon selection of a symbol having the number $a_i$ in any position of a group, $b$ being a whole number, storing means connected with the output terminals of said switching unit for registering the output terminals to which a voltage is supplied upon selection of a symbol, means actuated by said storing means for supplying a voltage to the corresponding input terminal of said switching unit before selection of the next symbol, means operative before selection of the first symbol of a group for applying a voltage to the zero input terminal ($A_0$) of said switching unit, an indicator displaying the check symbol, means for supplying the voltage appearing after selection of a group on any input terminal $A_r$ of said switching unit to said indicator in such manner that the same displays the check symbol pertaining to a remainder equal to $R_N(k_1r)$, $k_1$ being the factor $k_i$ for the position of the last symbol of a group, at least one key for adding a plurality $m$ of noughts to a sequence of figures already selected, and an N-polar switch actuated by said key and connecting any input terminal $A_p$ of said switching unit with an output terminal $D_q$ such that $q = R_N(w^m \cdot p)$ upon depression of said key, $w$ being the ratio of consecutive terms in said geometrical progression.

22. The combination of a business machine comprising a selector for inserting symbol groups, and a device for determining the check symbol of each symbol group inserted in said machine, comprising an indicator displaying the check symbol, at least one switching unit actuated by said selector, adapted to assume $n$ different positions according to the number of a selected symbol, having N input terminals and N output terminals, and so constructed that any input terminal $A_p$ is connected with an output terminal $D_q$ such that $$q=R_N[(k_{i+1}p+bN)/k_i+a_i]$$

upon selection of a symbol having the number $a_i$ in position $i$ of a group, $b$ being a whole number, means operative before selection of one of the extreme symbols of a group for applying a voltage to the zero input terminal ($A_0$) of the switching unit actuated by this selection, means for transferring the voltage appearing after selection of a symbol on an output terminal ($D_q$) of the switching unit actuated by this selection to the corresponding input terminal ($A_q$) of the switching unit actuated by the selection of the next symbol, and means for supplying the voltage appearing after selection of a group on any output terminal $D_r$ of the switching unit actuated by the selection of the other extreme symbol of a group to said indicator in such manner that the same displays the check symbol pertaining to a remainder $R_N(k_1r)$, $k_1$ being the factor $k_i$ for the position of said other extreme symbol.

23. A device for determining the check symbol of a symbol group, comprising a selector for inserting the symbols of a group, an indicator displaying the check symbol, at least one switching unit actuated by said selector, adapted to assume $n$ different positions according to the number of a selected symbol, having N input terminals and N output terminals, and so constructed that any input terminal $A_p$ is connected with an output terminal $D_q$ such that $$q=R_N[(k_{i+1}p+bN)/k_i+a_i]$$

upon selection of a symbol having a number $a_i$ in position $i$ of a group, $b$ being a whole number, means operative before selection of one of the extreme symbols of a group for applying a voltage to the zero input terminal ($A_0$) of the switching unit actuated by this selection, means for transferring the voltage appearing after selection of a symbol on an output terminal ($D_q$) of the switching unit actuated by this selection to the corresponding input terminal ($A_q$) of the switching unit actuated by the selection of the next symbol, and means for supplying the voltage appearing after selection of a group on any output terminal $D_r$ of the switching unit actuated by the selection of the other extreme symbol of a group to said indicator in such manner that the same displays the check symbol pertaining to a remainder equal to $R_N(k_1r)$, $k_1$ being the factor $k_i$ for the position of said other extreme symbol, and means for printing the check symbol displayed by said indicator.

No references cited.